(12) United States Patent
Taylor et al.

(10) Patent No.: US 7,978,627 B2
(45) Date of Patent: *Jul. 12, 2011

(54) SYSTEMS AND METHODS TO MONITOR COMMUNICATIONS TO IDENTIFY A COMMUNICATIONS PROBLEM

(75) Inventors: William Scott Taylor, Duluth, GA (US); David E. Massengill, Covington, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/603,313

(22) Filed: Oct. 21, 2009

(65) Prior Publication Data

US 2010/0039955 A1 Feb. 18, 2010

Related U.S. Application Data

(63) Continuation of application No. 10/185,771, filed on Jun. 28, 2002, now Pat. No. 7,636,320.

(51) Int. Cl.
*H04L 12/26* (2006.01)

(52) U.S. Cl. ........ 370/252; 370/229; 370/245; 370/254; 370/395.1; 370/395.6; 709/223; 709/245

(58) Field of Classification Search .................. 370/229, 370/254, 358, 395.1, 395.6, 395.61, 241.1–252; 709/245, 223–225

See application file for complete search history.

(56) References Cited

U.S. PATENT DOCUMENTS

| | | | |
|---|---|---|---|
| 5,848,058 A | 12/1998 | Ooyoshi et al. | |
| 5,991,814 A | 11/1999 | Rzonca et al. | |
| 6,041,042 A | 3/2000 | Bussiere | |
| 6,115,362 A | 9/2000 | Bosa et al. | |
| 6,192,034 B1 | 2/2001 | Hsieh et al. | |
| 6,208,650 B1 | 3/2001 | Hassell et al. | |
| 6,246,680 B1 | 6/2001 | Muller et al. | |
| 6,421,319 B1 | 7/2002 | Iwasaki | |
| 6,449,576 B1 | 9/2002 | Bass et al. | |
| 6,519,723 B1 | 2/2003 | Allred et al. | |
| 6,717,914 B1 | 4/2004 | Hamami | |
| 6,738,828 B1 | 5/2004 | Keats et al. | |

(Continued)

OTHER PUBLICATIONS

Jeff Caruso, "Analysis tools get in tune with switched nets," NetworkWorldFusion, www.nwfusion.com/archive/1999/60599_03-15-1999.html, Mar. 15, 1999, 2 pages.

(Continued)

*Primary Examiner* — William Trost, IV
*Assistant Examiner* — Toan D Nguyen
(74) *Attorney, Agent, or Firm* — Hanley, Flight & Zimmerman LLC (57) ABSTRACT

Systems and methods to monitor communications to identify a communications problem are disclosed. An example method to monitor communication includes mirroring a first port on a first network element communicatively coupled to a virtual circuit to a second port on a second network element communicatively coupled to the virtual circuit, mirroring a third port on a third network element coupled to the virtual circuit to the second network element, monitoring mirrored communications data at the second network element by receiving communications data on the second port that are sent to the first port from the third port or from the first port to the third port, and analyzing the monitored communications data to identify a communications problem based on a difference between communications data mirrored from the first port and communications data mirrored from the third port.

14 Claims, 4 Drawing Sheets

U.S. PATENT DOCUMENTS

| | | | |
|---|---|---|---|
| 6,751,226 | B1 | 6/2004 | Schow |
| 6,785,237 | B1 | 8/2004 | Sufleta |
| 6,839,751 | B1 | 1/2005 | Dietz et al. |
| 7,107,356 | B2 | 9/2006 | Baxter et al. |
| 7,180,865 | B1 | 2/2007 | Taylor et al. |
| 7,200,148 | B1 | 4/2007 | Taylor et al. |
| 7,209,476 | B1* | 4/2007 | Colloff et al. ................. 370/360 |
| 7,245,587 | B2* | 7/2007 | Phaal ............................ 370/244 |
| 7,340,039 | B1 | 3/2008 | Hawkins et al. |
| 7,388,948 | B2 | 6/2008 | Armanino et al. |
| 7,391,739 | B1 | 6/2008 | Taylor et al. |
| 2001/0055274 | A1* | 12/2001 | Hegge et al. ................. 370/229 |
| 2002/0103895 | A1 | 8/2002 | Chiang |
| 2002/0145981 | A1* | 10/2002 | Klinker et al. ............... 370/244 |
| 2002/0163934 | A1* | 11/2002 | Moore et al. .................. 370/465 |
| 2002/0191649 | A1 | 12/2002 | Woodring |
| 2003/0002436 | A1 | 1/2003 | Anderson et al. |
| 2003/0081284 | A1 | 5/2003 | Maki et al. |
| 2003/0145081 | A1 | 7/2003 | Lau et al. |
| 2004/0003094 | A1 | 1/2004 | See |
| 2005/0027892 | A1 | 2/2005 | McCabe et al. |
| 2005/0074006 | A1 | 4/2005 | Ambe et al. |
| 2008/0049630 | A1 | 2/2008 | Kozisek et al. |

OTHER PUBLICATIONS

John Curtis, "Port Mirroring: The duplex paradox," NetworkWorldFusion, www.nwfusion.com/newsletters/lans/1005lan2.html, Oct. 7, 1998, Network World, Inc., 2 pages.

United States Patent and Trademark Office, Official action issued in connection with U.S. Appl. No. 10/185,879, mailed Jul. 26, 2006, 17 pages.

United States Patent and Trademark Office, Official action issued in connection with U.S. Appl. No. 10/184,145, mailed Jul. 19, 2006, 13 pages.

United States Patent and Trademark Office, Official action issued in connection with U.S. Appl. No. 10/186,350, mailed Jun. 28, 2006, 9 pages.

United States Patent and Trademark Office, Notice of Allowance and Fees Due issued in connection with U.S. Appl. No. 10/185,771, mailed Sep. 9, 2009, 4 pages.

United States Patent and Trademark Office, Official action issued in connection with U.S. Appl. No. 10/185,771, mailed Jun. 30, 2006, 13 pages.

United States Patent and Trademark Office, Official action issued in connection with U.S. Appl. No. 10/185,771, mailed Aug. 9, 2007, 18 pages.

United States Patent and Trademark Office, Official action issued in connection with U.S. Appl. No. 10/185,771, mailed May 9, 2008, 21 pages.

United States Patent and Trademark Office, Official action issued in connection with U.S. Appl. No. 10/185,771, mailed Dec. 5, 2008, 20 pages.

United States Patent and Trademark Office, Official action issued in connection with U.S. Appl. No. 10/185,879, mailed Nov. 1, 2007, 12 pages.

United States Patent and Trademark Office, Official action issued in connection with U.S. Appl. No. 10/185,879, mailed Jan. 23, 2007, 11 pages.

David Willis, "Lifting the Fog with Frame Relay Management Products," www.networkcomputing.com, 2001, CMP Media, LLC, 3 pages.

David Willis, "Lifting the Fog with Frame Relay Management Products," www.networkcomputing.com, 2001, CMP Media, LLC, 2 pages.

David Willis, "Lifting the Fog with Frame Relay Management Products," www.networkcomputing.com, 2001, CMP Media, LLC, 2 pages.

David Willis, "Lifting the Fog with Frame Relay Management Products," www.networkcomputing.com, 2001, CMP Media, LLC, 2 pages.

David Willis, "Lifting the Fog with Frame Relay Management Products," www.networkcomputing.com, 2001, CMP Media, LLC, 3 pages.

Darrin Woods, "Adtran's iQ 710 Brings Frame Relay Monitoring to Layer 7," www.nwc.com, 2001, CMP Media, LLC, 2 pages.

Jeff Caruso, "Analysis tools get in tune with switched nets," NetworkWorldFusion, www.nwfusion.com/archive/1999/60599_03-15-1999.html, Mar. 15, 1999, 2 pages.

John Curtis, "Port Mirroring: The duplex paradox," NetworkWorldFusion, www.nwfusion.com/newsletters/lans/1005lan2.html, Oct. 7, 1998, Network World, Inc., 2 pages.

United States Patent and Trademark Office, Official action issued in connection with U.S. Appl. No. 10/185,879, mailed Jul. 26, 2006, 17 pages.

United States Patent and Trademark Office, Official action issued in connection with U.S. Appl. No. 10/184,145, mailed Jul. 19, 2006, 13 pages.

United States Patent and Trademark Office, Official action issued in connection with U.S. Appl. No. 10/186,350, mailed Jun. 28, 2006, 9 pages.

United States Patent and Trademark Office, Notice of Allowance and Fees Due issued in connection with U.S. Appl. No. 10/185,771, mailed Sep. 9, 2009, 4 pages.

United States Patent and Trademark Office, Official action issued in connection with U.S. Appl. No. 10/185,771, mailed Jun. 30, 2006, 13 pages.

United States Patent and Trademark Office, Official action issued in connection with U.S. Appl. No. 10/185,771, mailed Aug. 9, 2007, 18 pages.

* cited by examiner

SYSTEMS AND METHODS TO MONITOR COMMUNICATIONS TO IDENTIFY A COMMUNICATIONS PROBLEM

RELATED APPLICATION

This patent arises from a continuation of U.S. patent application Ser. No. 10/185,771, filed on Jun. 28, 2002, now U.S. Pat. No. 7,636,320, issued Dec. 22, 2009, the entirety of which is hereby incorporated by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

CROSS-REFERENCE TO RELATED APPLICATION

This application relates to Ser. No. 10/185,879, filed simultaneously, entitled "System and Method for Creating a Frame Relay Port Mirror," which is incorporated herein by reference. This application also relates to Ser. No. 10/186,350, filed simultaneously, entitled "System and Method for Analyzing Frame Relay Communications," which is incorporated herein by reference. This application also relates to Ser. No. 10/184,145, fled simultaneously, entitled "System and Method for Analyzing Asynchronous Transfer Mode Communications," which is incorporated herein by reference.

FIELD OF THE INVENTION

The present invention generally relates to monitoring a telecommunications network. The present invention more particularly relates to monitoring communications occurring between network elements.

BACKGROUND

According to Vertical Systems Group, customer installations of carrier-based fame relay services in 1991 consisted of 120 ports worldwide. By 2001, the number of ports bad increased to approximately 1.78 million. (http://www.verticalsystems.com/press15.html, Vertical Systems Group, Inc., Dedham, Mass.). Providers often route frame relay services over asynchronous transfer mode (ATM) backbones. According to the ATM Form (www.atmforum.com), approximately eighty percent of the world's telecommunications service providers use ATM in the core of their networks. (*Beginners' Overview of Asynchronous Transfer Mode (ATM)*, http://www.atmforum.com/pages/aboutatmtech/beginnersguide-.html). As the number of customer and network installations has increased, so has the difficulty of effectively and efficiently monitoring and managing the networks supporting the providers' customers.

Service providers and equipment vendors have attempted to address this increasing difficulty in a variety of ways. One approach taken by service providers has been to over-engineer communications networks in an attempt to alleviate problems resulting from the over-utilization of the fame relay and ATM network resources and corresponding decreases in the quality of service. Although over-engineering the network may help the provider ensure that their customer receives an adequate level of service, this approach is both expensive and an inefficient allocation of scarce resources, including both capital and labor.

Another approach that attempts to ensure at least a minimum customer service level is monitoring the frame relay and ATM networks at the end-points of a communication to determine if the network is performing adequately. Conventional approaches to monitoring the network end-points require additional hardware, additional software, or both. Hardware approaches utilize probes, which are installed between the network and the customer premises equipment (CPE) or between the network and a router or switch at the provider's facility. A probe may be a stand-alone network element or may be a hardware and/or software package integrated into a switch. For example, a Remote Monitoring (RMON) probe is a device or software agent that collects and compiles data about a network segment and transfers the collected information to a management workstation on request. RMON probes are generally utilized in TCP/IP and Ethernet environments.

Conventionally, probes communicate the network monitoring data to a network management workstation. The workstation may communicate a request to the probe, or the probe may periodically send data to the workstation. The workstation does not have to be on the same network as the probe and can manage the probe by in-band or out-of-band connections.

In addition to using separate network elements, such as probes, a provider may utilize a network element that incorporates software directly on the element. The software causes the network element to capture monitoring information and to send it to a network management workstation periodically or on request in a manner similar to that implemented by a hardware-based probe.

The installation of conventional probes, both hardware and software-based, on the network addresses the need to monitor and manage the network. However, this approach entails several disadvantages. Utilizing this approach requires installing either an additional physical device or installing additional monitoring software on an existing device. Additionally, not all network devices are compatible with monitoring software, and therefore, this approach may require the purchase of new network devices, such as switches, if a software approach is utilized. Also, this approach entails substantial expense, including the purchase cost of the probes, both hardware and software-based, the installation time and cost of the probe hardware and software at the various customer locations or other endpoints of a communication and the ongoing support cost, including software upgrade costs.

Another approach to monitoring the network is to analyze data as it arrives at the customer premises directly. One method for a network administrator, analyst, or automated system (hereinafter "analyst") to perform localized analyses is by setting up a mirror for a port, either the input or output port, on the customer premises equipment to another port on the same network element. Localized monitoring eliminates the additional cost required to install a probe and remote monitoring software. However, this approach requires the presence of an analyst to set up the mirror and to monitor the network. In addition, monitoring can only take place where the customer premises or other communications end-point equipment is physically located. And therefore, the analyst is unable to monitor both ends of the communication simultaneously. Localized monitoring is inefficient and expensive, particularly in terms of the analyst's valuable time.

None of the conventional approaches provides a means of efficiently and effectively monitoring and managing network communications end-points.

SUMMARY

The present invention provides systems and methods for monitoring communications in a frame relay or ATM network. In an embodiment of the present invention, a command is created to instruct a network element connected to the network to mirror one of the network element's ports to a port on a second network element that is also connected to the network. In one embodiment, the second element is a data collector that collects and stores the data for later use. In another embodiment, the second network element is an analyzer, allowing a user or expert system to monitor circuits within the network for problems or potential problems. In still another embodiment, an expert system provides an interface with which a user can analyze and interpret data transmitted to the analyzer.

In one embodiment of the present invention, the command for instructing the network element to mirror a port is a command message, such as a transaction language 1 (TL1) message. A preferred embodiment of the command message (1) identifies the network element to which the command is directed, (2) includes information instructing the network element to mirror a port and (3) identifies the destination port for the for the mirrored communications data.

In one embodiment of the present invention in which the command message is a TL1 command message, the message includes (1) a command code, instructing the network element to mirror a port; (2) a target identifier, identifying the network element to which the mirrored transmissions are directed; and (3) an access identifier, identifying the port to mirror. The TL1 command message may include additional parameters as well, including (4) a correlation tag, which is used to identify messages that occur as a result of the mirror port command; (5) a general block, providing implementation specific parameters; and (6) a message payload block, which includes various additional parameters as necessary or desired.

In one embodiment of the present invention, a data collector receives the data on the port specified in the command message and stores the data for later use. In another embodiment, the data collector is an analyzer or is connected to an analyzer. Once the data is received, an automated program or an analyst analyzes the data to attempt to determine the cause of problems or potential problems within the network. The analyzer may be any one of a number of types of network elements, including an off-the-shelf analyzer or a customized hardware and software analytical solution. An embodiment of the present invention may also include additional elements for analyzing monitoring data and for identifying problems and potential problems. For example, in one embodiment of the present invention, an expert system is in communication with the analyzer and provides tools, both automated and manual, for monitoring the network.

Embodiments of the present invention provide numerous advantages over conventional systems for monitoring a frame relay or ATM network. In an embodiment of the present invention, it is unnecessary to purchase and install separate hardware probes to monitor the network traffic. Eliminating an additional network device eliminates both purchase and maintenance costs and eliminates a potential source of errors or other problems caused by having additional elements in the network. Also, an embodiment of the present invention eliminates the need to install or upgrade network element management software.

An embodiment of the present invention also provides substantial advantages over mirroring one port on a network element to another port on the same element. An embodiment eliminates the need to travel to a remote site in order to monitor communications directed to or emanating from the remote site. Also, an embodiment of the present invention allows an analyst to monitor both ends of a communication simultaneously.

In terms of the Open System Interconnection Model, an embodiment of the present invention provides the capability of monitoring communications occurring at layer 2 and above without the need to connect to and monitor layer 1 or physical connections of a particular network element and corresponding network segment.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for monitoring communications in a frame relay or asynchronous transfer mode (ATM) network. In an embodiment of the present invention, a network administrator, analyst, or automated system hereinafter referred to as "analyst") creates a command. The command, when transmitted to a network element, instructs the network element to mirror a port on the network element to a port on a data collector or an analyzer in communication with the network. In one embodiment, the command is a Transaction Language 1 (TL1) command. Various other types of commands may also be utilized.

Figure 1:
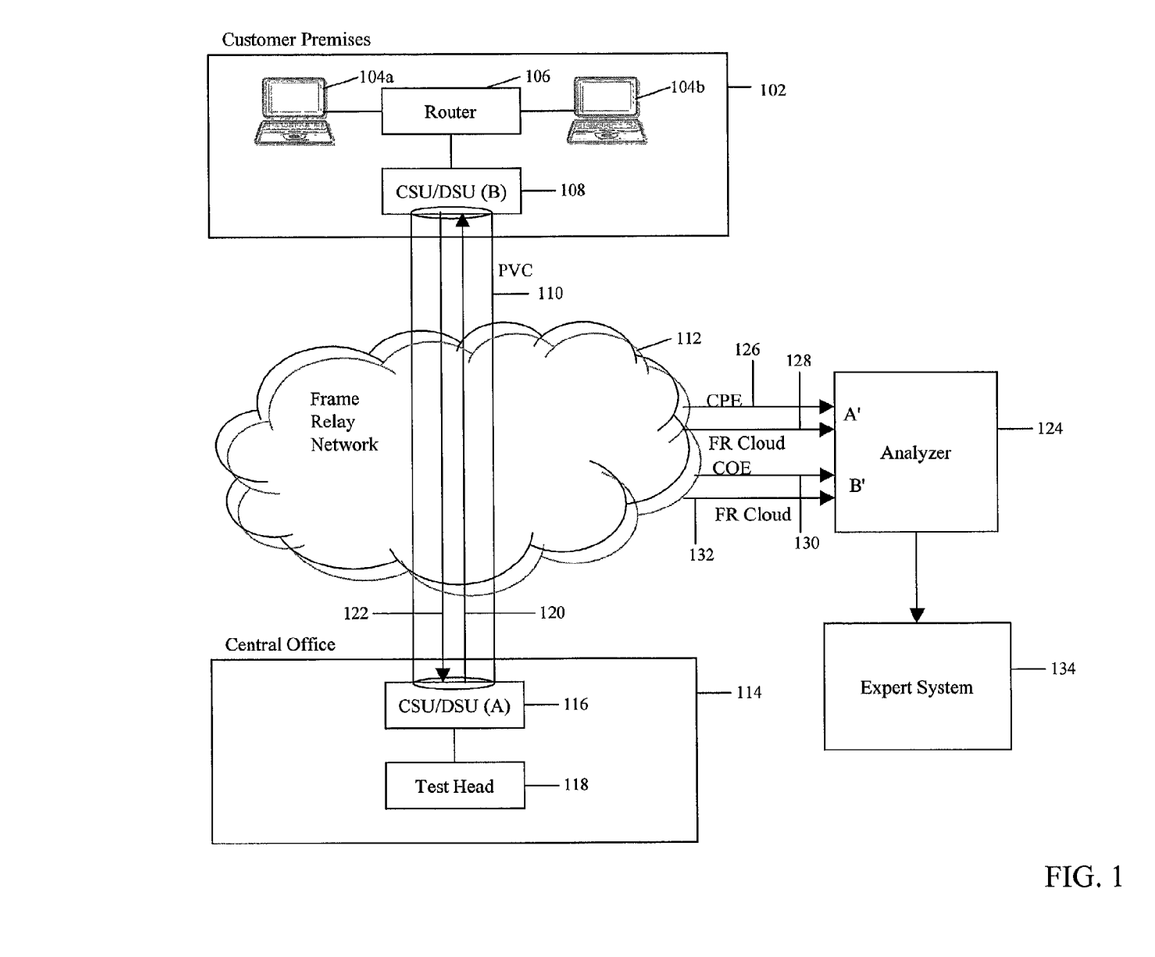
FIG. 1 is a block diagram of an exemplary environment for operation of an embodiment of the present invention.

FIG. 1 illustrates an exemplary environment for operation of an embodiment of the present invention. In the embodiment shown, a customer has a facility, customer premises 102, in which computer equipment (Customer Premises Equipment or CPE) is located The CPE includes client access devices, such as personal computers 104a and 104b. The computers 104a and 104b are in communication with a router 106, either directly or indirectly. A router, such as the router 106 shown in FIG. 1, provides intelligent routing of information between dissimilar networks. Other devices, such as a switch may be utilized instead of router 106 in various embodiments, such as in an ATM network.

In order to access the Internet, additional customer facilities, or other external facilities, the router 106 is linked to a Channel Service Unit/Data Service Unit (CSU/DSU) 108. Typically, conventional routers are linked to a CSU/DSU by connecting the router's V.35 port to the CSU/DSU with a cable. The CSU/DSU 108 acts as a termination point for a digital channel, performing various functions such as line conditioning and equalization between the incoming channel and various other CPE, including the router 106. In the embodiment shown, the CSU/DSU 108 allows the customer to connect via a virtual circuit such as a permanent virtual circuit (PVC) 110, to other facilities through a frame relay network 112. In other embodiments, the customer connects through an ATM network (not shown) or a combination of frame relay, ATM, and/or other network types. For example, frame relay service providers often internetwork ATM backbones and frame relay networks to provide the most cost-efficient and effective network offering to their customers. Examples of other facilities that customers access via a CSU/DSU include remote customer locations, supplier networks, and the Internet.

Frame relay is a conventional protocol for establishing a packet-switching network. A frame relay network 112 includes various network equipment, including switches, network routers, and multiplexers. These devices forward frames received by the frame relay network 112 to frame relay access devices (FRAD), such as CSU/DSU 108.

Frame relay uses variable sized packets called frames. The frames are statistically multiplexed. Open Systems Interconnect (OSI) is the name used to describe a series of related networking protocols and specifications, including the OSI Reference Model. The OSI Reference model describes an architecture consisting of seven layers. Layer 1 is the physical layer and consists of the physical network elements and connections. Layer 2 is the data link layer and includes technology-specific transfer elements. Layer 3 is the network layer and includes routing and relaying. Layer 4 is the transport layer and includes elements necessary for reliable data transfer. Layer 5 is the session layer and is responsible for dialog coordination. Layer 6 is the presentation layer and provides a mechanism for implementing syntax. Layer 7 is the application layer and includes semantics. An embodiment of the present invention provides the analyst with the capability of monitoring the frame relay network 112 at layer 2 and above (3-7) without connecting a physical device or adding software to the existing physical devices operating at level 1.

Frame relay eliminates most OSI layer 2 functionality. Frame relay does not "route" per se—frame relay only forwards and forgets. For example, although a frame relay network checks for error-free frames, the frame relay network makes no attempt to retransmit dropped frames. Because of the simplification, the throughput of a frame relay network is drastically increased, implementation is simpler and simplifies and limits the expense of implementing frame relay.

A frame relay network is not only fast and efficient; it is also flexible. Any protocol can be encapsulated and transmitted, and the frame relay network assumes no responsibility for protocol conversion. The conversions occur outside the network, which helps to make the frame relay network faster and less expensive to implement. The frame relay network includes error detection, but there is no attempt to correct or resend lost frames. The basic rule in frame relay networking is that if any problems exist in relation to a frame or in the network, the frame is discarded. The problems may include errors, such as data errors and/or network congestion. This approach to error handling, dropping frames in response to errors, is successful because frame relay facilities are fully digital which decreases the chances of losing or corrupting frames. Frame relay networks are optimized for data, i.e., bursty communication, but have also been implemented successfully for compressed voice and video Frames in a frame relay network 112 include a header and trailer. Included in the header is the data link connection identifier (DLCI). The DLCI identifies a particular destination end-point within the fame relay network, helping to further simplify routing through the frame relay network. When a frame arrives at a switch, the switch checks a routing table. If the DLCI exists in the routing table, the switch forwards the frame towards the destination, and if the DLCI does not exists, the switch discards the frame.

Asynchronous transfer mode (ATM) is a conventional protocol for establishing a packet-switching network. An ATM network includes various network equipment, including switches and multiplexers. In contrast to frame relay, ATM utilizes fixed-size packets called cells. ATM is sometimes referred to as a cell-switching protocol. The ATM cell includes a 48-byte (8 bit byte) payload and a five-byte header.

ATM provides high performance. This high performance is due to a number of factors. First, ATM combines multiplexing and switching within ATM switches. ATM switches use the virtual path and virtual channel identifiers within the ATM cell header to determine how to switch individual cells. Also, the relatively small, fixed-size cells provide efficient packaging of bursty traffic, such as data, voice, and video. The smaller, time-critical bits of information do not sit idle, waiting for large data packets to be packaged and transmitted.

ATM also provides various methods of optimizing network efficiency and, unlike frame relay, which specifies QoS at the interface, for providing specified quality-of-service (QoS) levels through the network. At the hardware level, a network administer can create multiple queues and multiple virtual circuits to support the variety of data types traversing the network. These queues and virtual circuits may vary by acceptable loss and delay rates, queuing rules, and flow controls, depending on the traffic projected to flow through them. An ATM network administrator may also implement controls at the network level. These controls include connection admission control (CAC) and routing and rerouting systems.

Communication through ATM and frame relay networks, such as frame relay network 112, occurs within a logical path called a virtual circuit. The virtual circuit may be a permanent or switched virtual circuit. Referring again to FIG. 1, CSU/DSU 108 is connected to permanent virtual circuit (PVC) 110. The analyst sets up the PVC 110 before it can be used. The PVC 110 is a fixed logical path. The actual physical path taken through the frame relay network 112 may vary from communication to communication. The PVC 110 shown in FIG. 1 connects two end points. Each end point corresponds to a DLCI. The second end point on PVC 110 in the embodiment shown is the service provider's central office 114. Central Office 114 includes a CSU/DSU 116 connected to the PVC 110 as well as a test head 118 connected to the CSU/DSU 116. The test head 118 provides the ability to generate signals across PVC 110 for testing purposes and may include additional features as well.

Communication between the customer premises 102 and the central office 114 is bi-directional across the PVC 110. However, for the sake of clarity, the traffic emanating from the central office 114 and directed to the customer premises 102 is illustrated by line 120, and traffic emanating from the customer premises 102 and directed to the central office 114 is illustrated by line 122.

Data received or transmitted by CSU/DSU 116 is received or transmitted on ports. A network device, such as CSU/DSU 116, 118 or router 106, has physical ports. A physical port is a physical interface between a device and a circuit, such as a socket to accept a network cable. The port may be analog or digital and either electrical or optical. A network device may also have logical ports, which are logical as opposed to physical points of connection between a device and a circuit. By providing logical ports, a network device can support multiple logical connections over a single physical connection.

In an embodiment of the present invention, the analyst assigns each DLCI to a logical port. The analyst assigns communication links 120 and 122 to a logical port and corresponding DLCI at the end point of the communication. Therefore, PVC 110 corresponds to two communication links 120, 122, each of which is associated with a DCLI.

In an embodiment of the present invention, in order to monitor communication links for potential problems, a data collection device is in communication with the network. In the embodiment shown in FIG. 1, the data collection device in communication with frame relay network 112 is an analyzer 124. To monitor the communication links 120, 122 associated with PVC 110, an analyst instructs a network device to mirror each of the logical ports associated with communications occurring across PVC 110 to logical ports on analyzer 124. The analyst may use various means to issue the command, including a command-line interface, a web-enabled interface, or a menu-driven interface.

Network elements include various hardware and software features that allow the functions performed by the network element to be modified. For example, a network element includes an operating system. The network element may also include a user interface, such as a command-line interface or web-enabled interface. To enable the network element to perform routing, switching, or other network processes, the network element has a processor, a communications bus, and some sort of memory, either read-only memory (ROM), random-access memory (RAM), or some combination of the two.

When the network element receives the mirror port command, the network element stores any settings necessary to perform the mirroring in this memory. These settings include information such as the port to be mirrored and the destination of the mirrored communications. When a network element, such as CSU/DSU 108, mirrors a port, the network element duplicates all communication entering or emanating from a port and transmits the communication to another logical port. The software necessary to perform the processing is stored in the memory of the CSU/DSU 108. The mirroring occurs on a frame-by-frame basis; the CSU/DSU 108 duplicates each frame that arrives at or emanates from the mirrored port and transmits the frame to the logical port designated in the mirror port instruction. The logical port to which the communication is directed may be a logical port on the same network element as the port to be mirrored or may be on a different network element in communication with the network element to be monitored. The second network element may be in direct communication with the first network element or may communicate with the first network element over a network, such as frame relay network 112.

Since the network element is able to transmit the mirrored communication across the frame relay network 112, both ends of the PVC 110 may be mirrored to the same network element, such as analyzer 124. Therefore, port mirroring in an embodiment of the present invention provides an opportunity to monitor both ends of a communication remotely.

For illustration purposes, the central office CSU/DSU 116 is labeled "A" and the customer premises CSU/DSU 108 is labeled "B." In an embodiment of the present invention, in order to monitor the network elements at each end of the PVC 110, each CSU/DSU 108, 116 receives a port mirror command identifying a port associated with the PVC 110 and a port on the analyzer 124 and supplying any other information necessary for creating the port mirror. After receiving the command, the CSU/DSU 108, 116 begins mirroring communications to the analyzer 124. A' and B' on the analyzer 124 represent the two sets of ports that receive communication from CSU/DSU 116 and CSU/DSU 108, respectively. The two logical ports at A' (1) receive data that is mirrored from the port for data transmitted from the equipment in the customer premises 102 to the central office 114, labeled CPE 126 in FIG. 1 and (2) receive data mirrored from the port for data received at the central office 114, labeled FR Cloud 128. The two logical at B' (1) receive data that is mirrored from the port for data transmitted from the equipment in the central office 114 to the customer premises 102, labeled CO 130 in FIG. 1 and (2) receive data mirrored from the port for data received at the customer premises 102 from the central office 114, labeled FR Cloud 132.

After the port mirror shown in FIG. 1 is established, each time the test head 118 in the central office transmits a communication to the customer premises 108, the CSU/DSU 108, 116 at each end of the communication mirrors the individual frames making up the communication to the appropriate logical port on the analyzer 124. For example, when the CSU/DSU (A) 116 transmits the communication, CSU/DSU (A) 116 duplicates the frames transmitted and transmits those frames to analyzer 124 at the CO logical port 130. When the CSU/DSU (B) 108 at the customer premises 102 receives the transmitted frames, the CSU/DSU (B) 108 duplicates the frames and transmits those frames to the analyzer at the FR Cloud logical port 128. The analyzer 124 now contains the data as it was transmitted and as it was received. An analyst can use this data to determine if any data errors or other problems occurred during transmission.

Various other types of equipment and software may be linked to the analyzer 124 to make use of the data received, such as databases, on-line analytical data processors, and predictive analysis tools. For example, in the embodiment shown in FIG. 1, an expert system 134 is linked to analyzer 124 to provide the user with a tool to further evaluate the data.

In an embodiment of the present invention, an analyst, such as expert system 134, creates a command to instruct the network element, such as the CSU/DSU 108, to mirror a port. The command identifies the device and port to be monitored as well as the device and port to which the communications should be directed. Various types of commands may be created to instruct the network element to mirror the port. For example, in one embodiment, the network device incorporates a web server and associated applications for administration of the device, including instructing the device to mirror the port to another device on the frame relay network 112. In such an embodiment, CSU/DSU (A) 116 includes web server software and associated administrative web pages in ROM. An analyst accesses the web pages by entering the network address, such as the IP address, in a web browser application on the analyst's computer. When the analyst enters the IP address, the web browser issues a request for a default web page from the CSU/DSU (A) 116. In response to receiving the request, the CSU/DSU (A) 116 provides a web page containing an option to create a port mirror. The analyst chooses the option, causing the CSU/DSU (A) 116 to provide a second HTML page to the browser. The second page includes a form with form fields for accepting the port mirror information and a button for submitting the information to the CSU/DSU (A) 116. When the CSU/DSU (A) 116 receives the submitted information, the CSU/DSU (A) 116 web server software processes the information to create the port mirror.

In another embodiment, common object request broker architecture (CORBA) is used to provide instructions to the network element. In such an embodiment, the CSU/DSU (A) 116 includes a CORBA-compliant component in ROM. An analyst executes an application on the analyst's computer that includes fields for entering the port-mirror information. When complete, the analyst clicks a button on the user interface, causing the application to remotely execute the CORBA-compliant component on the CSU/DSU (A) 116, passing the appropriate parameters. In yet another embodiment the analyst creates a transaction level 1 (TL1) command using a command-line interface. The analyst uses a telnet application to access the command-line interface executing on CSU/DSU (A) 116. The analyst then types the appropriate command and presses the "enter" key. This causes the CSU/DSU (A) 116 to accept the command and create the port mirror.

Figure 2:
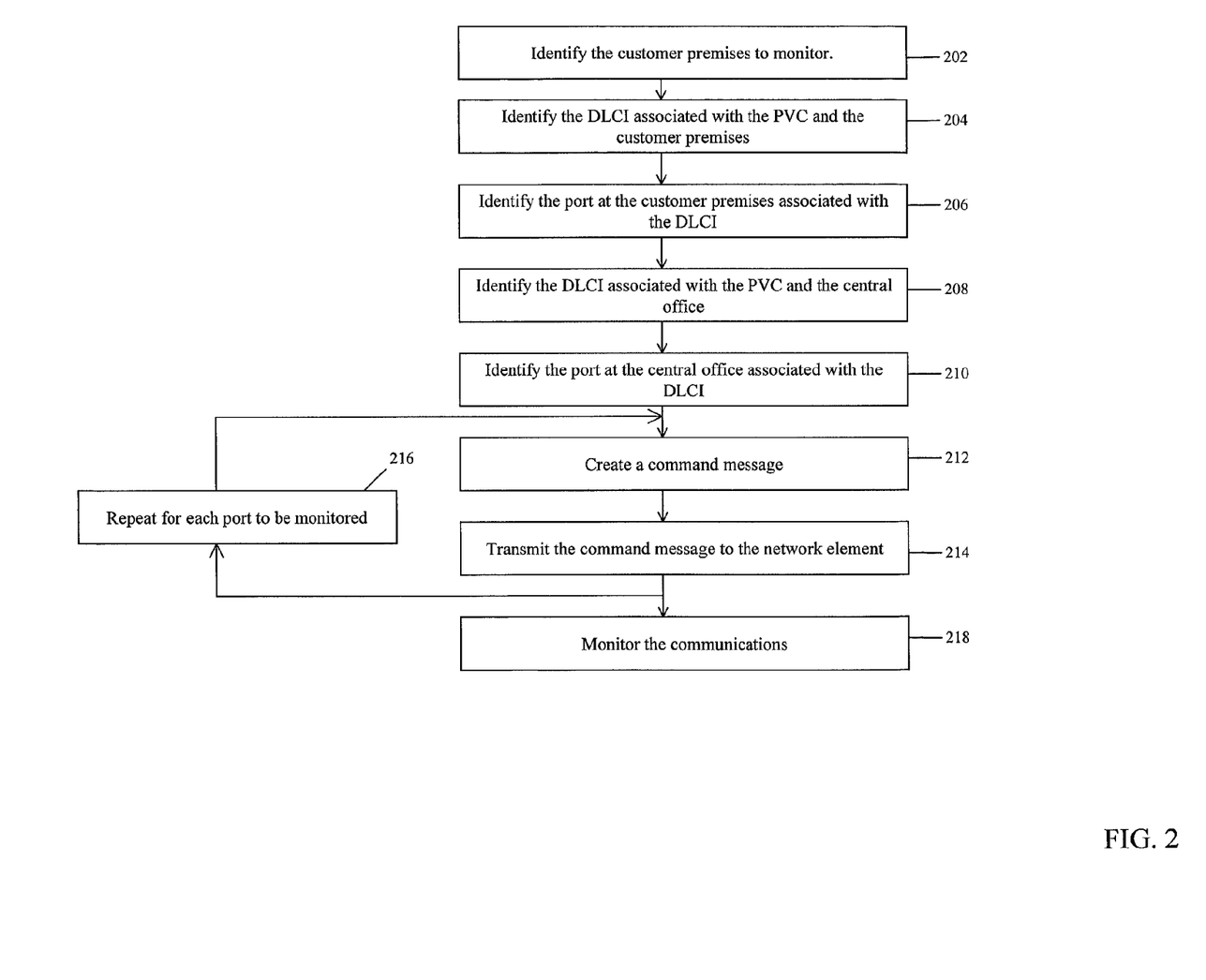
FIG. 2 illustrates a process for creating a command and instructing a network element to mirror a port in an embodiment of the present invention.

FIG. 2 illustrates the process of instructing a network element to monitor communications between two end points. For clarity, the process illustrated in FIG. 2 is described with reference to the embodiment shown in FIG. 1. An analyst first identifies a potential problem with PVC (110), which terminates at the customer premises (102) 202. The analyst then determines the DLCI associated with the PVC (110) 204. The analyst next identifies the port associated with the DLCI 206. Once the ports are identified for the customer premises (102), the analyst performs a similar process for the central office (114). The analyst identifies the DLCI at the central office (114) that is associated with the PVC (110) and identifies the port associated with the DLCI 210.

Once the analyst identifies the ports, the analyst causes a message to be sent to each of the network elements, instructing the network elements to mirror the appropriate port on the network element across the frame relay network (112) to a port on the analyzer (124). First, the analyst creates a command message, using a command-line or other interface 212. The analyst then transmits the command message to the appropriate network element 214. The analyst repeats these two steps for each network element 216 for which monitoring is desired. In response to the analysts input to transmit the command, the user interface converts the command to data, encapsulates the data as a computer data signal, and transmits the computer data signal in a digital data stream. The interface transmits the command to the network element in the same manner as any data traveling through the network. When the network element receives the command, the network element uses software stored in memory to process the command and set up the port mirror.

Additional parameters may be specified as well. For example, in one embodiment implemented in an ATM network, the channel is also specified as part of the command message. A channel or virtual channel connection is a basic ATM unit, defining a connection for transporting cells from end point to end point. The ATM network bundles the channels into a virtual path between ATM switches. The ATM network may also bundle virtual circuits into virtual path to improve efficiency.

Once the commands have been generated and transmitted, the analyst begins monitoring the communications 218. For example, the customer using customer premises 102 experiences intermittent problems with communications occurring between customer premises 102 and another facility. These communications occur over the frame relay network 112. An analyst suspects that a problem may be occurring between the customer premises 102 and the central office 114 that serves the customer premises 102. The analyst sets up the appropriate port mirrors, and instructs the test head 118 to begin sending test data packets to a client computer 104a located at customer premises 102. When the test head 118 begins transmitting the packets, the CSU/DSU (A) 116 encapsulates the packets into frame relay frames and transmits the packets across frame relay network 112 to CSU/DSU (B) 108. The CSU/DSU (A) 116 also duplicates the transmitted frames and transmits the duplicate frames to analyzer 124. When the CSU/DSU (3) 108 receives the frames, it duplicates and transmits the received frames to analyzer 124.

Once the analyzer 124 receives both sets of frames, the analyzer 124 presents the analyst with a user interface (not shown). The user interface may vary depending on the type of analyzer 124. The user interface may functions to display, sort, filter, and decode the frames received from the mirrored ports. The user interface may also include a variety of metrics that can by used by an analyst, such as network availability, congestion level, delay, utilization versus committed information rate, and dropped frames.

For example, SnifferPro software can be used to capture and analyze packet data to and/or from a specified port. Network Associates Technology, Inc., Santa Clara, Calif.) A filter in the software can be set to capture only traffic on PVC 110. The software includes a GUI that allows an analyst to search and capture based on various parameters entered by the analyst. The GUI is then able to display the collected data and allow the analyst to search and sort the displayed data to identify the problem.

In one embodiment, the user interface displays the frames sent by a first device and received by a second device in one direction of a monitored portion of a communication. The analyst compares the two sets of frames to identify problems in the frame relay network 112 generally and in the PVC 110 specifically. For example, the analyst compares the number of frames transmitted with the number received to determine how many frames were dropped during transmission. If the number of dropped frames is high, the frame relay network 112 may be congested or a problem may exist in one of the switches within the frame relay network 112. The analyst may also compare the size of the frames transmitted with the size of those received. A difference in size indicates corruption of the frames. The analyst may perform various other tests as well.

In one embodiment of this invention, the network device accepts transaction language 1 (TL1) commands. TL1 is a vendor-independent telecom management protocol implemented in optical, broadband, and network access devices used in North America, other than circuit switches. TL1 is an ASCII or man-machine management protocol, i.e., a person can understand the commands. TL1 supports a standard command-line interface and also supports machine-to-machine communications. TL1 also provides the capability to define user-specific extensions.

A TL1 command includes a number of elements, including (1) a command code, (2) a target identifier, (3) an access identifier, (4) a correlation tag, (5) a general block, and (6) a message payload block. Not all elements are required in any one command. In an embodiment of the present invention the command code is an instruction for the network element to mirror a port. The target identifier identifies the network element to which the mirrored communications are directed. The access identifier identifies a specific port on the network element to mirror. The correlation tag, which is optional, serves to identify subsequent messages related to the port mirror command, including a code identifying the network element, port, and other related information. The general block, which is also optional, provides implementation specific parameters, includes parameters necessary or desired for a particular network element in a particular frame relay network to mirror the port across the network. The message payload block includes additional information as desired or necessary.

Figure 3:
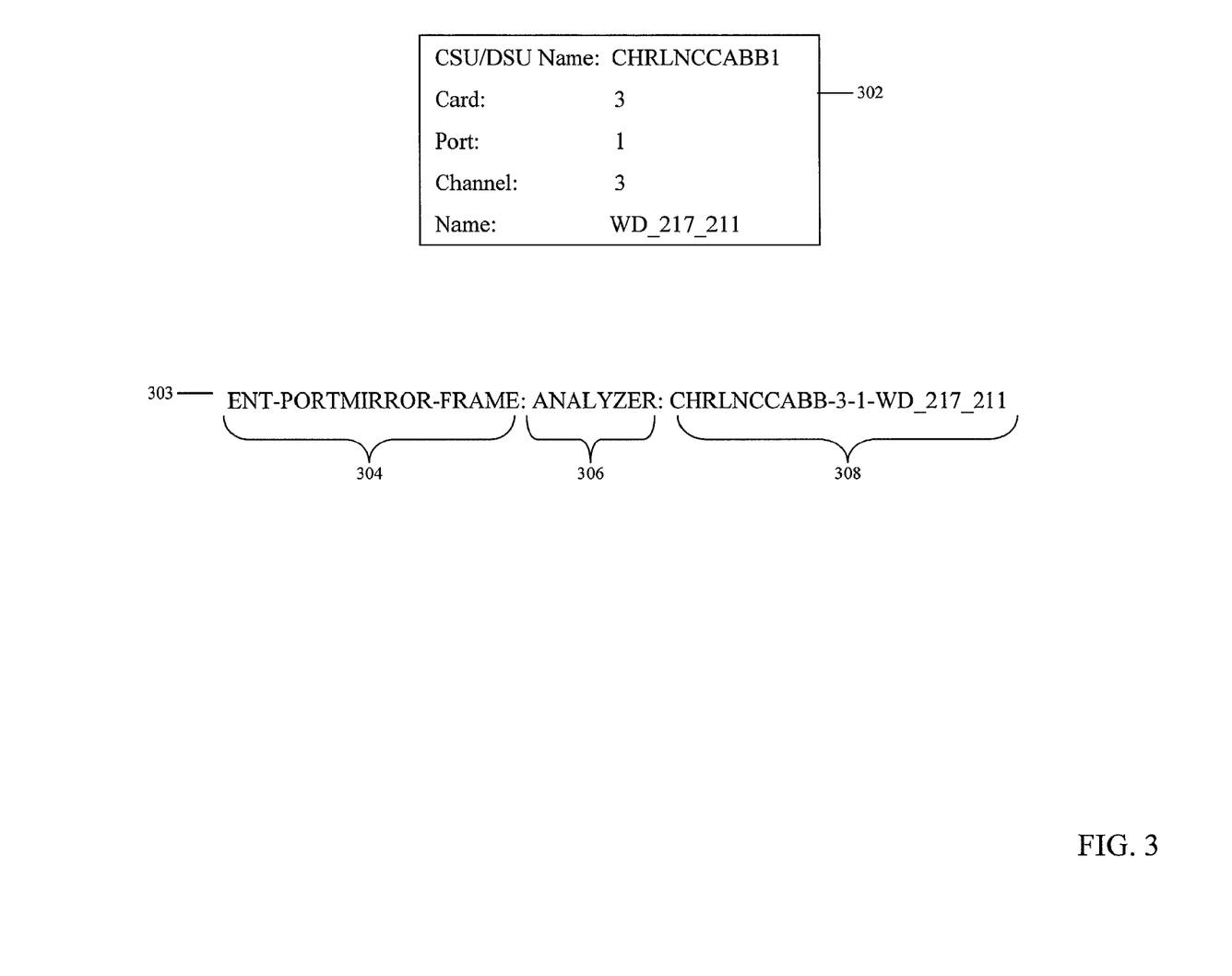
FIG. 3 illustrates an exemplary transaction language 1 (TL1) command in an embodiment of the present invention.

FIG. 3 illustrates an embodiment of a command for mirroring a port and channel on CSU/DSU (B) (108) in FIG. 1. The command shown is a TL1 command, but other formats may be used. An analyst first determines the network element and port information for the command. Text box 302 contains the relevant information for CSU/DSU (B) (108). The TL1 command 303 to instruct the CSU/DSU to mirror the port is listed below the text box 302. The command code for the TL1 command 303 in the embodiment shown is "ENT-PORT-MIRROR-FRAME" 304. The command shown is applicable to a frame relay network. In an embodiment of the present invention implemented in an ATM network, the command may differ. For example, in one embodiment in an ATM network, the TL1 command is "ENT-PORTMIRROR-ATM". The target identifier is "ANALYZER," which refers to analyzer 124 in FIG. 1. The access identifier, which specifies the appropriate port and channel, is "CHRLNCCABB-3-1-WD_217_211" 308. The command shown 303 does not include a correlation tag or any of the other optional elements of the TL1 command. Other embodiments may include the optional elements defined herein or other additional elements as needed or desired.

Although the embodiment shown in FIG. 1 includes both an analyzer 124 and an expert system 134, any test device that supports frame relay networking can be utilized as the destination of the port mirroring in an embodiment of the present invention. In one embodiment, the analyzer 124 is an off-the-shelf analyzer that allows the user to view the raw communications data as it is received. In another embodiment, the analyzer 124 includes more advanced features, including issuing alerts and presenting the data in graphical form.

The analyzer 124 captures various measurements related to the communications along PVC 110. For example, in one embodiment, the analyzer 124 measures dropped frames, delay, and availability. The analyzer may also perform calculations and measure the performance of the communication against implementation-specific or provider-specified criteria, such as the committed information rate (CIR) or committed burst rate (CBR). For example, in one embodiment, the analyzer 124 compares the bandwidth utilization to the CIR. In another embodiment, the analyzer 124 performs inherent congestion detection by tracking the number of lost frames occurring over a specified period of time.

One embodiment of the present invention also includes an expert system 126. The expert system 126 includes a knowledge base as well as an inference engine or other algorithms useful for identifying and solving problems associated with the PVC 110. Although the expert system 126 conventionally includes a knowledge base and inference engine, the complexity of the system may vary across a substantial range. For example, in one embodiment, the expert system 126 is a spreadsheet application that imports data from the analyzer 124 and presents the data graphically. In another embodiment, the expert system 126 is a sophisticated application, specifically designed to analyze and identity potential and existing problems within a telecommunications network.

Figure 4:
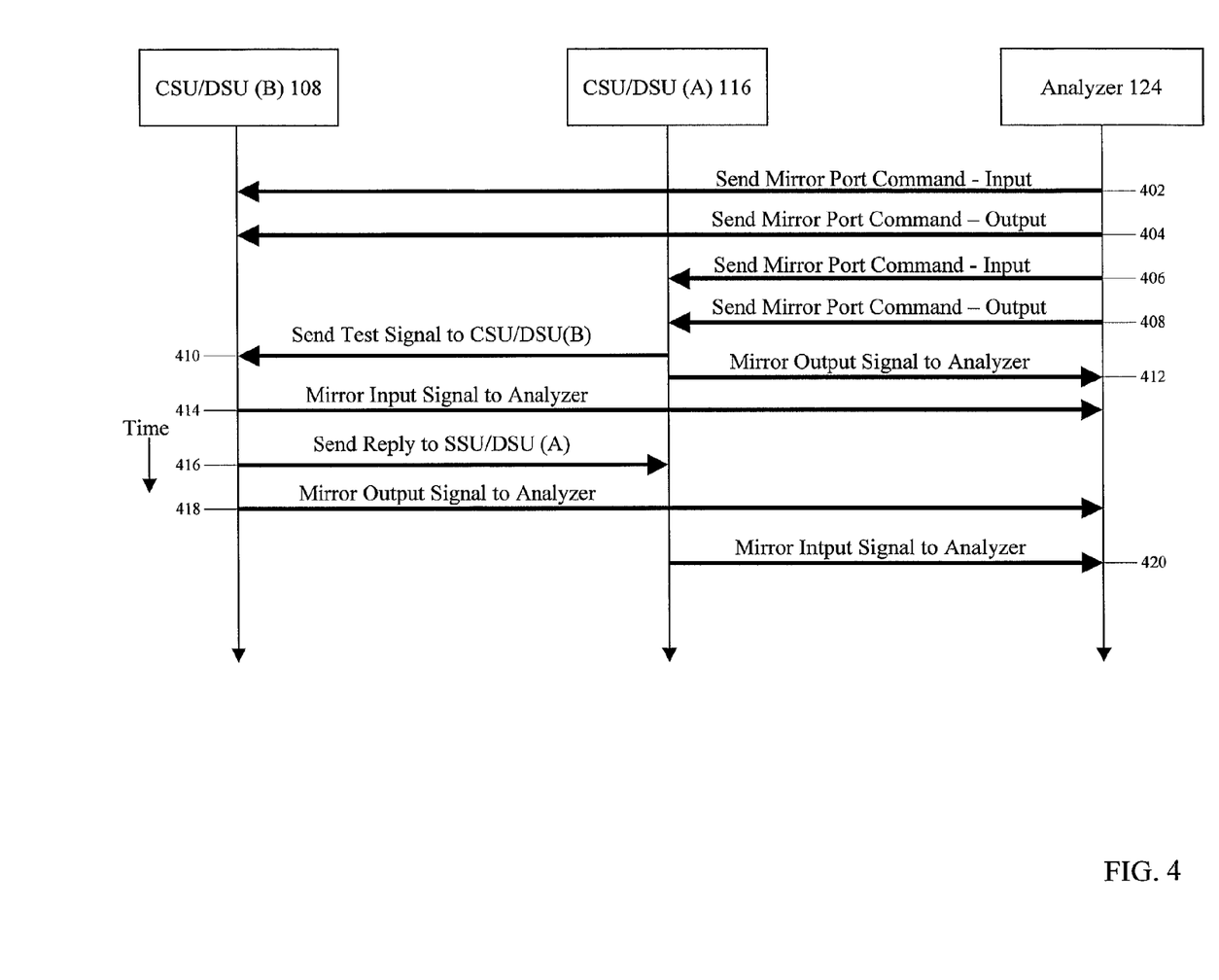
FIG. 4 illustrates a timing diagram of the information flow between network elements and between the network elements and an analyzer in an embodiment of the present invention.

FIG. 4 illustrates a timing diagram of information flow between network elements and between network elements and an analyzer in an embodiment of the present invention. If a potential problem appears in PVC 110, an analyst attempts to diagnose and correct the problem. For example, in an embodiment of the present invention in which the analyst uses the analyzer to diagnose problems, the analyst first identifies the network elements, DLCIs and ports associated with the PVC (110) as illustrated in FIG. 2. The analyst ten creates or causes the analyzer (124) to create a TL1 message instructing the CSU/DSU (B) (108) at the customer premises (102) to mirror the input port. The analyst enters the command and causes the analyzer (124) to send the mirror output port command to CSU/DSU (B) (108) 402. The analyst then creates and causes the analyzer (124) to send the mirror input port command to CSU/DSU (B) (108) 404. The analyst repeats this process for CSU/DSU (A) (116), which results in the sending of mirror input and output port commands to CSU/DSU (A) (116), 406, 408.

Once the CSU/DSUs have received the mirror port command, they mirror the specified ports to ports on the analyzer (124). For example, in the timing diagram shown, CSU/DSU (A) (116) sends a test signal to CSU/DSU (B) (108) 410. When CSU/DSU (A) (116) sends the signal, the output port mirrors the output signal to the analyzer (124) 412. When the test signal reaches the input port of CSU/DSU (3) (108), the port mirrors the input signal to the analyzer (124) 414.

A similar series of messages occurs when the CSU/DSU (B) (108) sends a reply signal to CSU/DSU (A) (116) 416. The output port of CSU/DSU (B) (108) mirrors the output port to the analyzer (124) 418. And when the CSU/DSU (A) (116) receives the signal, the CSU/DSU (A) (116) mirrors the input port to the analyzer (124) 420.

The signals continue to flow between CSU/DSU (B) (108) and CSU/DSU (A) (116) for as long as mirroring is enabled. The analyst uses the analyzer to view the data provided to the analyzer 124 and to make decisions regarding any type of steps that need to be taken to eliminate a problem or potential problem, such as replacing a particular switch or modifying parameters of a PVC.

A service provider may monitor and correct problems in the PVC 110 as an ancillary service to providing the PVC 110 to the customer. The service provider may instead or in addition charge an additional fee for certain levels of monitoring and error correction services. In one embodiment of the present invention, a computer executing billing software is in communication with the analyzer 124 and/or the expert system 134. The computer may be in direct communication with the analyzer 124 and/or expert system 134 or may communicate with these systems via a network. The software tracks the customer, the service, monitoring the PVC 110 for example, and the amount of time spent monitoring. The software may track other information as well, such as which analyst performs the monitoring.

In one embodiment the service provider includes the cost of monitoring in the periodic charge for providing communications services. In another embodiment, the service provider charges the customer a periodic charge for providing the monitoring service. In such embodiments, the information gathered by the tracking software is used merely to provide information to the service provider or customer. In yet another embodiment, the provider charges the customer when port mirroring and analysis occur. For example, in such an embodiment, when the analyst uses the user interface to create and transmit the port mirror command, the billing software creates an entry in a database, detailing the information related to the analyst's activities. The billing software computes a charge based on the amount of time spent monitoring the PVC 110 and correcting the problem and based on the hourly rate charged for the analyst's time. The billing system stores in or transmits the charge to the service provider's central billing database. When the service provider creates the periodic bills for the customer, the charge for monitoring the PVC is included on the bill.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. A method for monitoring communication comprising:
mirroring a first port on a first network element communicatively coupled to a virtual circuit to a second port on a second network element communicatively coupled to the virtual circuit;
mirroring a third port on a third network element coupled to the virtual circuit to the second network element;
monitoring mirrored communications data at the second network element by receiving communications data on the second port that are sent to the first port from the third port or from the first port to the third port; and
analyzing the monitored communications data to identify a communications problem based on a difference between communications data mirrored from the first port and communications data mirrored from the third port.

2. The method as defined in claim 1, further comprising receiving at the second port a first signal input to the first port and a second signal output from the third port, wherein the first and second signals correspond to a message transmitted from the third network element to the first network element.

3. The method as defined in claim 2, further comprising receiving at the second port a first signal output from the first port and a second signal input to the third port, wherein the first and second signals correspond to a message transmitted from the first network element to the third network element.

4. The method as defined in claim 1, wherein the difference between communications data comprises at least one of a size difference or a number of dropped frames.

5. The method as defined in claim 1, wherein the virtual circuit comprises at least one of a frame relay network or an asynchronous transfer mode network.

6. The method as defined in claim 1, wherein the first network element comprises at least one of a channel service unit or a data service unit.

7. The method as defined in claim 1, further comprising sending a first command message to the first network element to mirror the first port to the second port on the second network element and sending a second command message to the third network element to mirror the third port to the second port or to a fourth port on the second network element.

8. A system for monitoring communications, comprising:
an analyzer to transmit a first command message to a first network element and to transmit a second command message to a second network element to remotely monitor communications data between a first port at the first network element and a second port at the second network element using a third port at the analyzer, and to receive communications data on the third port that are sent to the first port from the second port and to receive communications data on the third port that are sent from the first port to the second port, the first network element, the second network element, and the analyzer are to communicate with a network via a virtual circuit, the first command message is to cause the first network element to mirror the first port to the third port, and the second command message is to cause the second network element to mirror the second port to the third port; and
an expert system to process the monitored communications data to identify a communication problem.

9. The system as defined in claim 8, wherein the analyzer receives at the third port a first signal input to the first port and a second signal output from the second port, wherein the first and second signals correspond to a message transmitted from the second network element to the first network element.

10. The system as defined in claim 8, wherein the analyzer receives at the third port a first signal output from the first port and a second signal input to the second port, wherein the first and second signals correspond to a message transmitted from the first network element to the second network element.

11. The system as defined in claim 8, wherein the analyzer generates the command message to include:
a mirror port command;
a source network element port identifier to identify the first port; and
a destination network element port identifier to identify the second port.

12. The system as defined in claim 11, wherein the command message comprises a transaction language 1 (TL1) command message.

13. The system as defined in claim 12, wherein the TL1 command message comprises:
a command code, instructing the first network element to mirror the first port;
a target identifier identifying the first network element; and
an access identifier, identifying the first port.

14. The system as defined in claim 8, wherein the expert system comprises a spreadsheet application to import data from the analyzer and present the data graphically.

* * * * *